(12) United States Patent
Teufel et al.

(10) Patent No.: US 6,752,455 B2
(45) Date of Patent: Jun. 22, 2004

(54) VEHICLE SEAT, ESPECIALLY A MOTOR VEHICLE SEAT

(75) Inventors: Ingo Teufel, Rockenhausen (DE); Joachim Mühlberger, Obersülzen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/230,822

(22) Filed: Aug. 28, 2002

(65) Prior Publication Data

US 2003/0042771 A1 Mar. 6, 2003

(30) Foreign Application Priority Data

Sep. 1, 2001 (DE) .......................................... 101 42 984

(51) Int. Cl.[7] .............................. B60N 2/42; A47C 1/01
(52) U.S. Cl. .............................. 297/216.1; 297/216.16; 297/216.17; 297/216.19; 297/344.15
(58) Field of Search .................... 297/216.16, 216.17, 297/216.19, 216.2, 344.15; 248/652, 664

(56) References Cited

U.S. PATENT DOCUMENTS

| | | | | |
|---|---|---|---|---|
| 2,942,646 A | * | 6/1960 | Himka et al. | ................ 297/341 |
| 3,802,737 A | * | 4/1974 | Mertens | ..................... 297/216.2 |
| 3,848,923 A | | 11/1974 | Dehler | |
| 3,957,304 A | | 5/1976 | Koutsky et al. | |
| 4,046,349 A | * | 9/1977 | MacAfee | ..................... 248/424 |
| 4,784,434 A | | 11/1988 | Iwami | |
| 5,005,894 A | | 4/1991 | Nagata | |
| 5,219,202 A | | 6/1993 | Rink et al. | |
| 5,324,095 A | * | 6/1994 | Yamauchi | ................ 297/344.14 |
| 5,437,494 A | * | 8/1995 | Beauvais | ................ 297/216.19 |
| 5,449,218 A | * | 9/1995 | Beauvais et al. | ...... 297/216.19 |
| 5,531,404 A | | 7/1996 | Marechal | |
| 5,556,159 A | | 9/1996 | Canteleux | |
| 5,733,008 A | | 3/1998 | Tame | |
| 5,782,533 A | * | 7/1998 | Fischer et al. | ............... 297/338 |
| 5,882,061 A | * | 3/1999 | Guillouet | ................. 296/65.05 |
| 5,882,080 A | | 3/1999 | Houghtaling et al. | |
| 5,979,985 A | * | 11/1999 | Bauer et al. | ................. 297/340 |
| 6,022,074 A | | 2/2000 | Swedenklef | |
| 6,048,034 A | * | 4/2000 | Aumont et al. | ............. 297/478 |
| 6,109,690 A | | 8/2000 | Wu et al. | |
| 6,112,370 A | | 9/2000 | Blanchard et al. | |
| 6,244,656 B1 | * | 6/2001 | Mueller | ................. 297/216.13 |
| 6,250,705 B1 | | 6/2001 | Zuch | |
| 6,299,252 B1 | * | 10/2001 | Frohnhaus et al. | ......... 297/338 |
| 2001/0038233 A1 | | 11/2001 | Eklind | |
| 2002/0011746 A1 | | 1/2002 | Muhlberger et al. | |

FOREIGN PATENT DOCUMENTS

| | | | | |
|---|---|---|---|---|
| DE | 3237167 A1 | * | 4/1984 | ............ B60N/1/00 |
| DE | 4129497 A1 | | 3/1993 | |
| DE | 29623024 U1 | | 11/1997 | |
| DE | 199 27 503 A1 | | 12/2000 | |
| DE | 199 27 508 A1 | | 3/2001 | |
| DE | 199 53 630 A1 | | 5/2001 | |
| EP | 0 463 436 A2 | | 1/1992 | |
| EP | 0 624 515 A1 | | 11/1994 | |
| EP | 0 882 619 A2 | | 12/1998 | |
| FR | 2 775 449 | | 9/1999 | |
| WO | WO 97/10117 | | 3/1997 | |
| WO | WO 99/67105 | | 12/1999 | |

* cited by examiner

Primary Examiner—Peter M. Cuomo
Assistant Examiner—Sarah C. Burnham
(74) Attorney, Agent, or Firm—Alston & Bird LLP

(57) ABSTRACT

In a vehicle seat, especially a motor vehicle seat, having a backrest (29; 129) and having a seat part (3; 103) which has an articulated structure (7; 107) which, in the event of a rear crash, experiences a change in geometry, the change in geometry of the articulated structure (7; 107) at least partly compensates for the rearward displacement of the backrest (29; 129).

26 Claims, 2 Drawing Sheets

VEHICLE SEAT, ESPECIALLY A MOTOR VEHICLE SEAT

BACKGROUND OF THE INVENTION

The present invention relates to a vehicle seat, especially a motor vehicle seat, having an articulated structure which experiences a change in geometry in the event of a rear crash.

DE 199 53 630 A1 discloses a vehicle seat in which, in the event of a crash, a change in the geometry of the articulated structure of the height adjuster activates a blocking device which makes the articulated structure rigid. This rigidification prevents non-uniform introduction of forces into the articulated structure, in order to protect the occupant.

BRIEF SUMMARY OF THE INVENTION

One aspect of the present invention is the provision of improved protection for the occupant in a vehicle seat.

In accordance with one aspect of the present invention, a vehicle seat, especially a motor vehicle seat, includes a backrest and a seat part, with the seat part having an articulated structure that experiences a change in geometry in the event of a rear crash. In accordance with this aspect, the change in geometry of the articulated structure at least partly compensates for the rearward displacement of the backrest.

The fact that the change in geometry of the articulated structure at least partly compensates for the rearward displacement of the backrest, which takes place because of the rear crash, the backrest is better able to accommodate, support and consequently protect the occupant, who is then moved relative to the backrest and towards it. The invention can be applied to adjustable-height vehicle seats and to vehicle seats without a height adjuster.

The necessary change in the geometry of the articulated structure is preferably carried out as a righting movement, which lifts the rear region of the seat frame, carrying the backrest, relative to the front region and, overall, displaces it rearwards, for example as the result of an enlargement of the distance between the lower bearing points. By selecting the dimensions and angles in the articulated structure, the righting movement can be controlled. The rear bearing point is preferably displaced in the event of a rear crash, for example by way of at least partial plastic deformation of a deformable element which, at the same time, is able to dissipate energy of movement. However, other changes in the geometry of the articulated structure are also possible which ultimately lead to a forward pivoting movement of the backrest.

BRIEF DESCRIPTION OF THE SEVERAL VIEWS OF THE DRAWINGS

In the following text, the invention is explained in more detail using two exemplary embodiments which are illustrated in the drawings, in which.

DETAILED DESCRIPTION OF THE INVENTION

Figure 1:
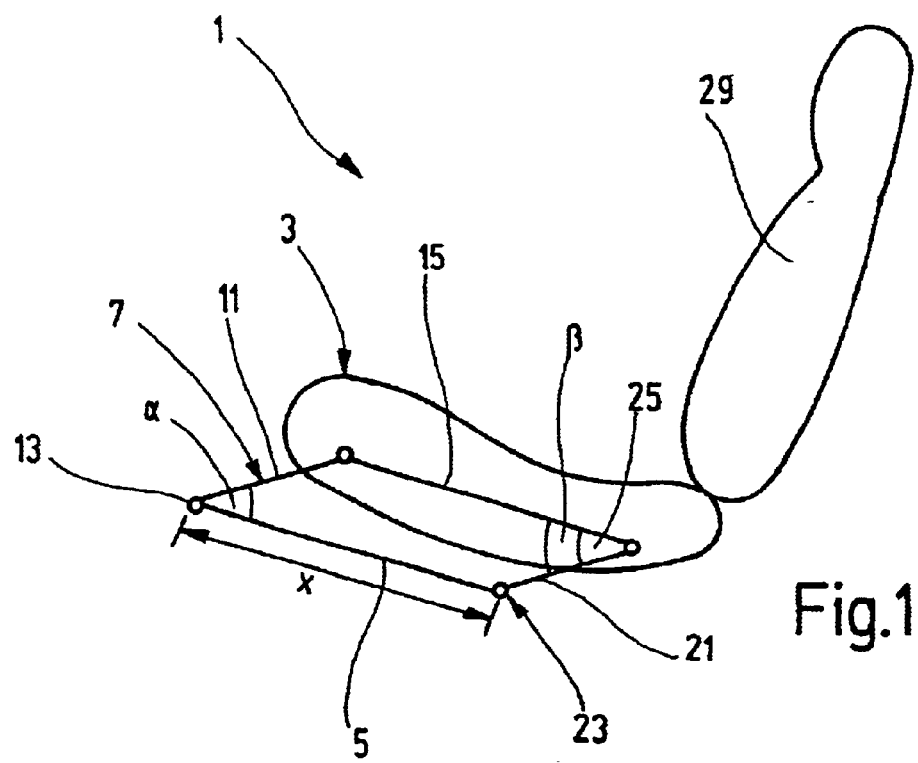
FIG. 1 shows a schematic representation of the first exemplary embodiment with an articulated structure in the normal case.
Figure 2:
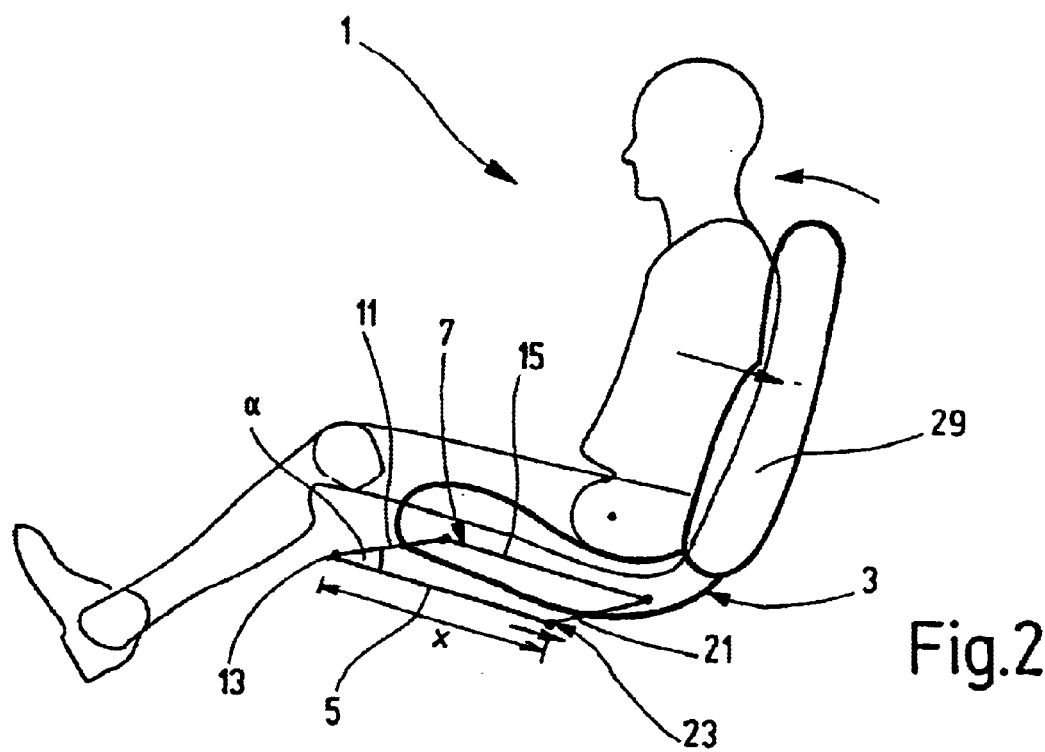
FIG. 2 shows a representation corresponding to FIG. 1 in the event of a rear crash.
Figure 3:
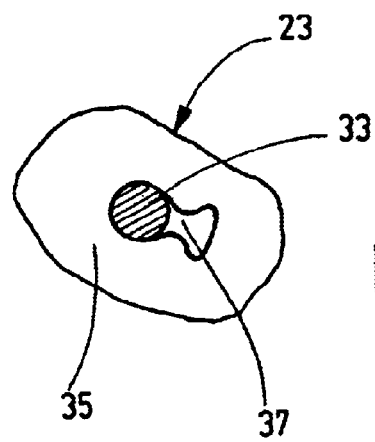
FIG. 3 shows a schematic detailed representation of a rear bearing point of the first exemplary embodiment in the normal case.
Figure 4:
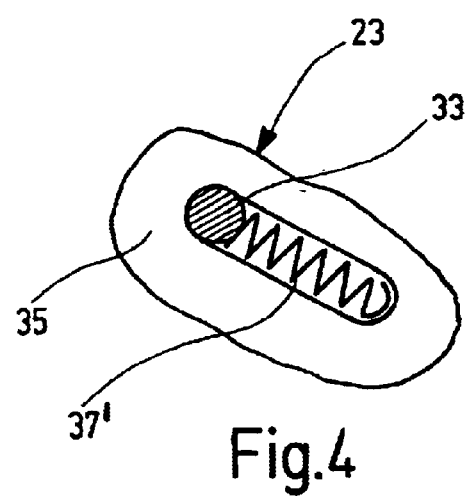
FIG. 4 shows a representation corresponding to FIG. 3 of a rear bearing point in a modified embodiment.
Figure 5:
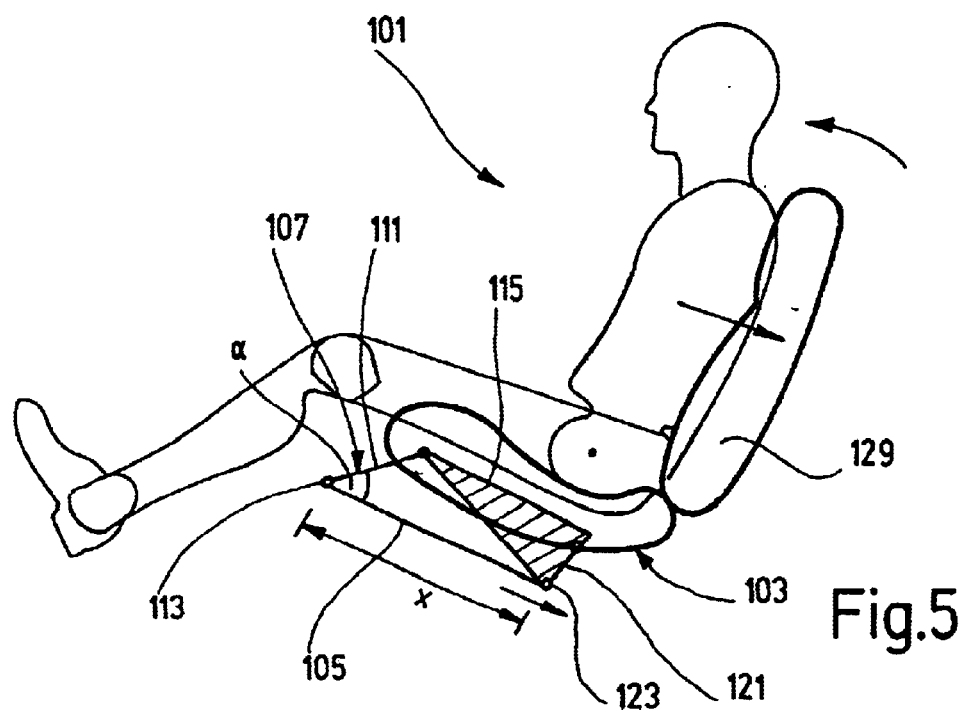
FIG. 5 shows a representation corresponding to FIG. 2 of the second exemplary embodiment.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

In the first exemplary embodiment, a vehicle seat 1 is designed as an adjustable-height driver's seat for a motor vehicle. The seat part 3 of the vehicle seat 1 can be adjusted in the seat longitudinal direction in a manner known per se by way of pairs of seat rails, comprising a lower rail and an upper rail 5 guided in the lower rail. As a height adjuster, the seat part 3 has, on each side of the vehicle seat, an articulated structure formed as a four-bar linkage 7. The four-bar linkage 7 comprises the upper rail 5, a front swinging arm 11 (e.g., pivot arm), a seat frame 15, and a rear swinging arm 21 (e.g., pivot arm). The front swinging arm 11 is inclined rearwards and, on one side, is attached to the upper rail 5 by way of a front hinge 13 and, on the other side, is attached to the seat frame 15. The rear swinging arm 21 is inclined rearwards and, as a rear coupling area, is attached on one side to the upper rail 5 by way of a rear bearing point 23 and, on the other side, is attached to the seat frame 15.

In the four-bar linkage 7, the distance measured along the upper rail 5 between the front hinge 13 and the rear bearing point 23 is designated by x, the angle between the upper rail 5 and the front swinging arm 11 is designated by $\alpha$, and the angle between the seat frame 15 and the rear swinging arm 21 is designated by $\beta$. Between the rear swinging arm 21 and the seat frame 15, that is to say in the region of the angle $\beta$, a drive 25 for motorized activation of the height adjuster 7 acts on one side of the vehicle seat. On the seat frame 15, the backrest 29 is fitted by way of inclination adjusting fittings, which are not specifically illustrated.

The rear bearing point 23 substantially comprises a bearing pin 33 to attach the rear swinging arm 21 and a bearing region 35 which is fixed to the upper rail and which encloses the bearing pin 33, forming a slotted guide. In the normal case (e.g., prior to a rear crash exceeding a predetermined magnitude, and while the height adjuster 7 is idle or operated to adjust the height in either direction), the bearing pin 33 is located at the front end of this slotted guide in the direction of travel. Behind the bearing pin 33 in the direction of travel, the bearing region 35 has, as a load limiter, for example a deformation zone 37 in the form of a narrowing or, in a modified design, a deformation element 37'. The deformation zone 37 or the deformation element 37' are preferably predominantly plastically deformable in order to dissipate energy of movement (e.g., in order to dissipate energy in the event of the rear crash exceeding a predetermined magnitude), but they can also have resilient components.

In the event of a rear crash, the seat rails of the vehicle seat 1, which are connected directly to the vehicle structure, are accelerated forwards more severely than the parts articulated by joints, in particular the seat frame 15 and the backrest 29. Under a defined load (e.g., in the event of a rear crash exceeding a predetermined magnitude), the load limiter provided in the rear bearing point 23 deforms, so that the bearing pin 33 moves rearwards. The distance x is enlarged, while the angle α decreases at the same time. The angle β, however, remains unchanged because of the blocking action of the drive 25. The change in the geometry of the four-bar linkage 7, defined by the changes in x and α, leads to a righting movement of the rear swinging arm 21, that is to say a pivoting movement in the counterclockwise direction according to the drawing, the pivot axis not being fixed in position. Because of the angle β remaining constant, the seat frame 15 is lifted in its rear region by the movement of the rear swinging arm 21 and, because of the reduction in the angle α, is lowered in its front region, the seat frame 15 simultaneously being displaced somewhat rearwards. As a result, a component of movement of the backrest 29 with an aligning action is produced, which at least partly compensates for the rearward displacement because of the rear crash, that is to say the backrest 29 is moved forward somewhat relative to the occupant sinking into it, and in this way can support the occupant better.

The second exemplary embodiment largely equates to the first exemplary embodiment, in particular with regard to its crash characteristics, for which reason identical and identically acting components are identified by reference symbols increased by 100. In the seat part 103 of the vehicle seat 101, x again designates the distance between the front hinge 113 and the rear bearing point 123, while α designates the angle between the upper rail 105 and the front swinging arm 111 (e.g., pivot arm). However, the vehicle seat 101 is designed without a height adjuster, that is to say the seat frame 115 and the rear swinging arm 121 (e.g., pivot arm) are connected rigidly to each other. Instead of a four-bar linkage, there is therefore a three-bar linkage 107.

In the event of a rear crash, the resilient-plastic displacement in the rear bearing point 123, which is constructed in the same way as in the first exemplary embodiment or the modification thereof, leads to an enlargement of x and a reduction of α. The seat frame 115 is likewise lowered at its front end and raised at its rear end, so that the backrest 129, as in the first exemplary embodiment, executes a slight forward pivoting movement.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vehicle seat for being mounted in a vehicle that has a front and a rear, and for operating advantageously in the event of a rear crash of the vehicle, the vehicle seat comprising:

a seat part including a front and a rear, wherein the front of the seat part is for being oriented toward the front of the vehicle and the rear of the seat part is for being oriented toward the rear of the vehicle; and a backrest mounted for extending at least generally upward from proximate the rear of the seat part, wherein the seat part includes an articulated structure mounted so that the articulated structure experiences a change in geometry in response to the rear crash exceeding a predetermined magnitude, and said change in geometry at least partially compensates for any rearward displacement of the backrest resulting from the rear crash, wherein a rear coupling region of the articulated structure is mounted so that:

the rear coupling region is in a first configuration prior to said change in geometry, the rear coupling region moves into a second configuration in response to the rear crash exceeding the predetermined magnitude, as part of said change in geometry, and the second configuration is more upright than the first configuration, and wherein:

the articulated structure includes a front hinge in a lower region of the articulated structure, the rear coupling region of the articulated structure is mounted at a rear bearing point in the lower region of the articulated structure, and the rear bearing point comprises at least one deformable element which is operative so that the deformable element deforms in response to the rear crash exceeding the predetermined magnitude so that said change in geometry comprises the rear bearing point being displaced rearward relative to the front hinge so that a distance between the front hinge and the rear bearing point is enlarged in response to the rear crash exceeding the predetermined magnitude.

2. A vehicle seat according to claim 1, wherein the rear bearing point has, in a bearing region, a bearing pin that is supported by the deformable element.

3. A vehicle seat according to claim 1, wherein the rear coupling region of the articulated structure comprises a rear pivot arm mounted so that:

the rear pivot arm is in a rearwardly inclined configuration prior to said change in geometry, with the rearwardly inclined configuration comprising a lower end of the rear pivot arm being positioned forwardly of an upper end of the rear pivot arm, and the rear pivot arm moves into an upright configuration during said change in geometry, whereby the rear pivot arm moves into the upright configuration in response to the rear crash exceeding the predetermined magnitude.

4. A vehicle seat according to claim 1, wherein the articulated structure includes a seat frame having a front and a rear, the rear coupling region is mounted to the rear of the seat frame, and said change in geometry of the articulated structure lowers the front of the seat frame and raises the rear of the seat frame.

5. A vehicle seat according to claim 3, wherein the articulated structure includes a seat frame having a front and a rear, the rear pivot arm is mounted to the rear of the seat frame, and said change in geometry of the articulated structure lowers the front of the seat frame and raises the rear of the seat frame.

6. A vehicle seat according to claim 1, wherein said change in geometry is a first change in geometry of the articulated structure, the vehicle seat further includes a drive mounted to the articulated structure for causing a second change in geometry of the articulated structure, the second change in geometry is different from the first change in geometry, and the second change in geometry adjusts a height of an upper portion of the articulated structure, whereby the articulated structure functions as a height adjuster during the second change in geometry.

7. A vehicle seat according to claim 3, wherein said change in geometry is a first change in geometry of the articulated structure, the vehicle seat further includes a drive mounted to the articulated structure for causing a second change in geometry of the articulated structure, the second change in geometry is different from the first change in geometry, and the second change in geometry adjusts a height of an upper portion of the articulated structure, whereby the articulated structure functions as a height adjuster during the second change in geometry.

8. A vehicle seat according to claim 1, wherein:
said change in geometry is a first change in geometry of the articulated structure,
the articulated structure is also operative for experiencing a second change in geometry,
the second change in geometry is different from the first change in geometry,
the second change in geometry adjusts a height of an upper portion of the articulated structure, whereby the articulated structure functions as a height adjuster, and
the upper portion of the articulated structure is positioned higher than the front hinge and the rear bearing point of the articulated structure, such that the distance between the front hinge and the rear bearing point corresponds to a base of the articulated structure.

9. A vehicle seat according to claim 1, wherein:
the articulated structure is in the form of a four-bar linkage that includes the front hinge, the rear coupling region, and the rear bearing point,
said change in geometry is a first change in geometry of the four-bar linkage,
the vehicle seat further includes a drive for causing a second change in geometry of the four-bar linkage,
the second change in geometry adjusts a height of an upper portion of the four-bar linkage, and
the rear bearing point is operative so that the distance between the front hinge and the rear bearing point remains constant during second change in geometry,
whereby the second change in geometry is different from the first change in geometry.

10. A vehicle seat according to claim 1, wherein said change in geometry is a first change in geometry, and the vehicle seat further comprises
a drive mounted to the articulated structure for causing a second change in geometry of the articulated structure, wherein the second change in geometry is different from the first change in geometry, and the second change in geometry adjusts a height of an upper portion of the articulated structure, whereby the articulated structure functions as a height adjuster during the second change in geometry.

11. A vehicle seat according to claim 1, wherein the articulated structure includes a seat frame having a front and a rear, and the rear coupling region is mounted to the rear of the seat frame in a manner so that the rear of the seat frame and the backrest are raised as a result of the rear bearing point being displaced rearward relative to the front hinge in response to the rear crash exceeding the predetermined magnitude.

12. A vehicle seat according to claim 1, wherein:
the rear coupling region of the articulated structure comprises a rear pivot arm;
the rear bearing point further comprises a bearing pin which carries the rear pivot arm in the rear coupling region;
said change in geometry comprises the bearing pin being displaced rearward relative to the front hinge so that a distance between the front hinge and the bearing pin is enlarged in response to the rear crash exceeding the predetermined magnitude; and
the deformable element is positioned rearwardly of the bearing pin prior to said change in geometry which results from the rear crash exceeding the predetermined magnitude.

13. A vehicle seat for being mounted in a vehicle that has a front and a rear, and for operating advantageously in the event of a rear crash of the vehicle, the vehicle seat comprising:
a seat part including:
a seat frame including a front and a rear, wherein the front of the seat frame is for being oriented toward the front of the vehicle and the rear of the seat frame is for being oriented toward the rear of the vehicle,
a height adjuster for adjusting a height of the seat frame, the height adjuster including:
a front pivot arm having a pivotably mounted lower end and an upper end which is pivotably mounted to the front of the seat frame, and
a rear pivot arm having a pivotably mounted lower end and an upper end which is pivotably mounted to the rear of the seat frame, and
a drive mounted so that when the drive is operated the drive causes the front and rear pivot arms to pivot relative to the seat frame and thereby adjust the height of the seat frame; and
a backrest mounted for extending at least generally upward from proximate the rear of the seat frame,
wherein the height adjuster is operative so that the height adjuster experiences a change in geometry in response to the rear crash exceeding a predetermined magnitude, and the change in geometry compensates for any rearward displacement of the backrest resulting from the rear crash, with said change in geometry causing at least the rear of the seat frame to pivot upwardly, and wherein:
the lower end of the rear pivot arm pivots at a rear bearing point, and
the rear bearing point comprises at least one deformable element which is operative so that the deformable element deforms in response to the rear crash exceeding the predetermined magnitude so that said change in geometry comprises the rear bearing point being displaced rearward relative to the front pivot arm so that a distance between the front hinge and the rear bearing point is enlarged in response to the rear crash exceeding the predetermined magnitude.

14. A vehicle seat according to claim 13, wherein the mounting of the front and rear pivot arms is such that said change in geometry causes an upper portion of the backrest to pivot upwardly and forwardly.

15. A vehicle seat according to claim 13, wherein the drive of the height adjuster includes a motor operative for providing motorized activation of the height adjuster.

16. A vehicle seat according to claim 13, wherein:
the rear pivot arm is in a first configuration prior to said change in geometry,
in the first configuration, the lower end of the rear pivot arm is positioned forwardly of the upper end of the rear pivot arm, whereby the rear pivot arm is inclined rearward,
the rear pivot arm moves into a second configuration during said change in geometry, and
the second configuration is more upright than the first configuration.

17. A vehicle seat according to claim 13, wherein said change in geometry causing at least the rear of the seat frame to pivot upwardly comprises the rear of the seat frame and the backrest being raised as a result of the rear bearing point being displaced rearward relative to the front pivot arm in response to the rear crash exceeding the predetermined magnitude.

18. A vehicle seat according to claim 13, wherein the drive is operative so that:
an angle defined between the rear pivot arm and the seat frame is changed during the adjusting of the height of the seat frame, and
said angle defined between the rear pivot arm and the seat frame is not changed during said change in geometry which occurs in response to the rear crash exceeding the predetermined magnitude.

19. A vehicle seat according to claim 13, wherein:
the rear bearing point further comprises a bearing pin by which the lower end of the rear pivot arm is pivotably mounted in the rear coupling region;
said change in geometry comprises the bearing pin being displaced rearward relative to the front hinge so that a distance between the front pivot arm and the bearing pin is enlarged in response to the rear crash exceeding the predetermined magnitude; and
the deformable element is positioned rearwardly of the bearing pin prior to said change in geometry which results from the rear crash exceeding the predetermined magnitude.

20. A vehicle seat for being mounted in a vehicle that has a front and a rear, and for operating advantageously in the event of a rear crash of the vehicle, the vehicle seat comprising:
a seat part including:
a seat frame including a front and a rear, wherein the front of the seat frame is for being oriented toward the front of the vehicle and the rear of the seat frame is for being oriented toward the rear of the vehicle,
a front pivot arm having an upper end, which is pivotably mounted to the front of the seat frame, and a lower end, which is pivotably mounted to a reference structure, and
a rear arm having an upper end, which is connected to the rear of the seat frame, and a lower end, which is connected to the reference structure; and
a backrest mounted for extending at least generally upward from proximate the rear of the seat frame,
wherein the seat part is operative so that the seat part experiences a change in geometry in response to the rear crash exceeding a predetermined magnitude, and said change in geometry compensates for any rearward displacement of the backrest resulting from the rear crash, with said change in geometry at least causing the rear of the seat frame to pivot upwardly, and
wherein the seat part is constructed so that said change in geometry does not include any substantial relative movement between the rear arm and the seat frame, and wherein:
the lower end of the rear pivot arm is mounted to the reference structure at a rear bearing point, and
the rear bearing point comprises at least one deformable element which is operative so that the deformable element deforms in response to the rear crash exceeding the predetermined magnitude so that said change in geometry comprises the rear bearing point being displaced rearward relative to the front pivot arm so that a distance between the front hinge and the rear bearing point is enlarged in response to the rear crash exceeding the predetermined magnitude.

21. A vehicle seat according to claim 20, wherein the rear arm and the seat frame are connected rigidly to each other.

22. A vehicle seat according to claim 20, wherein:
the rear arm and the seat frame are pivotably connected to one another;
the rear arm, the seat frame, the front arm, and the reference structure cooperate with one another to define a four-bar linkage which functions as a height adjuster for adjusting a height of the seat frame;
said change in geometry is a first change in geometry of the four-bar linkage; and
the height adjuster further includes a drive, wherein:
the drive is mounted so that when the drive is operated for height-adjustment purposes, the drive causes a second change in geometry that adjusts a height of the seat frame and is different from the first change in geometry, and
the drive is operative to restrict any substantial relative movement between the rear arm and the seat frame while the drive is not operating for height-adjustment purposes.

23. A vehicle seat according to claim 20, wherein:
the rear pivot arm is in a first configuration prior to said change in geometry,
in the first configuration, the lower end of the rear pivot arm is positioned forwardly of the upper end of the rear pivot arm, whereby the rear pivot arm is inclined rearward,
the rear pivot arm moves into a second configuration during said change in geometry, and
the second configuration is more upright than the first configuration.

24. A vehicle seat according to claim 20, wherein said change in geometry causing at least the rear of the seat frame to pivot upwardly comprises the rear of the seat frame and the backrest being raised as a result of the rear bearing point being displaced rearward relative to the front pivot arm in response to the rear crash exceeding the predetermined magnitude.

25. A vehicle seat according to claim 22, wherein the drive is operative so that:
an angle defined between the rear pivot arm and the seat frame is changed during the second change in geometry that adjusts the height of the seat frame, and
said angle defined between the rear pivot arm and the seat frame is not changed during said first change in geometry which occurs in response to the rear crash exceeding the predetermined magnitude.

26. A vehicle seat according to claim 20, wherein:
the rear bearing point further comprises a bearing pin by which the lower end of the rear pivot arm is mounted in the rear coupling region;
said change in geometry comprises the bearing pin being displaced rearward relative to the front pivot arm so that a distance between the front pivot arm and the bearing pin is enlarged in response to the rear crash exceeding the predetermined magnitude; and
the deformable element is positioned rearwardly of the bearing pin prior to said change in geometry which results from the rear crash exceeding the predetermined magnitude.

* * * * *